Figure 1:
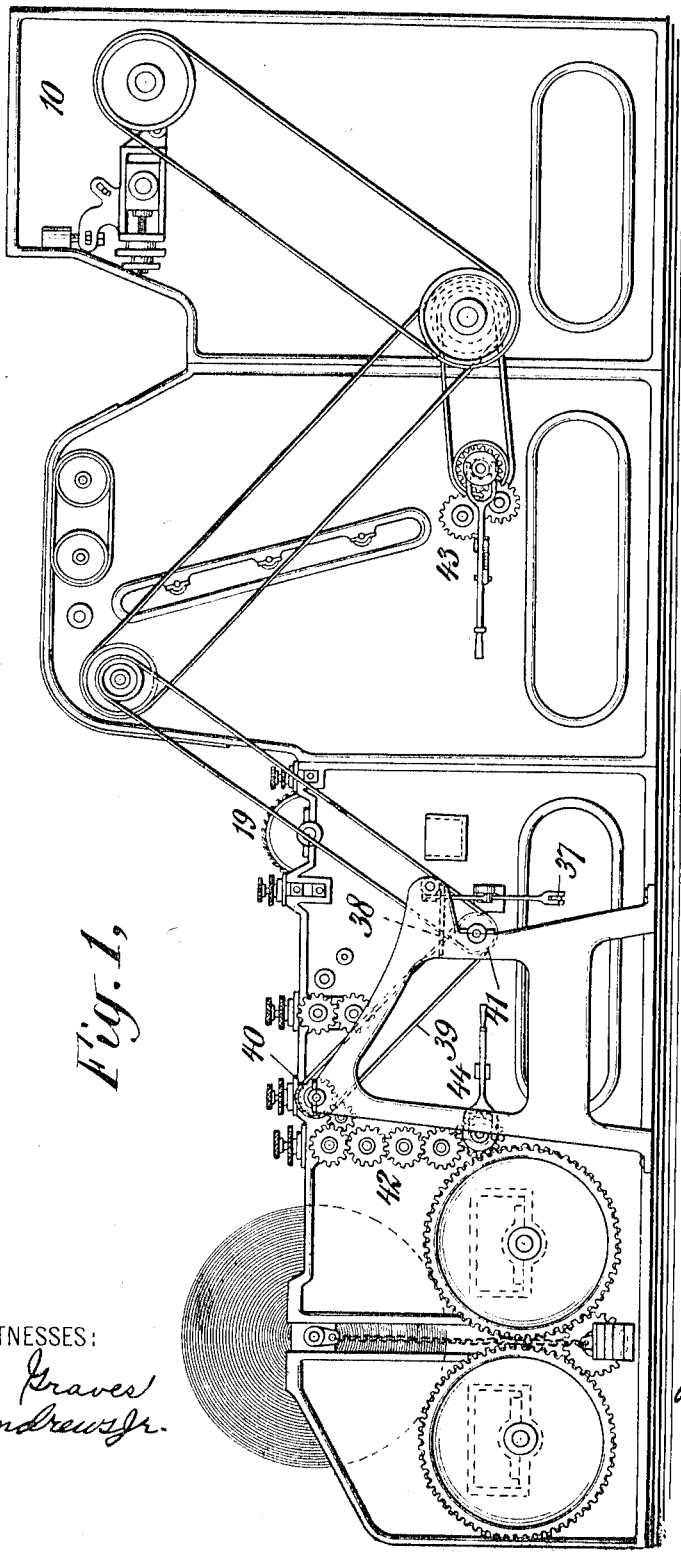

W. H. HARRISS.
APPARATUS FOR PREPARING COTTON FIBERS.
APPLICATION FILED JULY 20, 1909.

1,117,567.

Patented Nov. 17, 1914.
5 SHEETS—SHEET 1.

WITNESSES:

INVENTOR

BY
his ATTORNEYS

W. H. HARRISS.
APPARATUS FOR PREPARING COTTON FIBERS.
APPLICATION FILED JULY 20, 1909.

1,117,567.

Patented Nov. 17, 1914.
5 SHEETS—SHEET 2.

WITNESSES:
F. B. Graves
L. S. Andrews Jr.

INVENTOR
William N. Harriss
BY
his ATTORNEYS

W. H. HARRISS.
APPARATUS FOR PREPARING COTTON FIBERS.
APPLICATION FILED JULY 20, 1909.
1,117,567.
Patented Nov. 17, 1914.
5 SHEETS—SHEET 3.
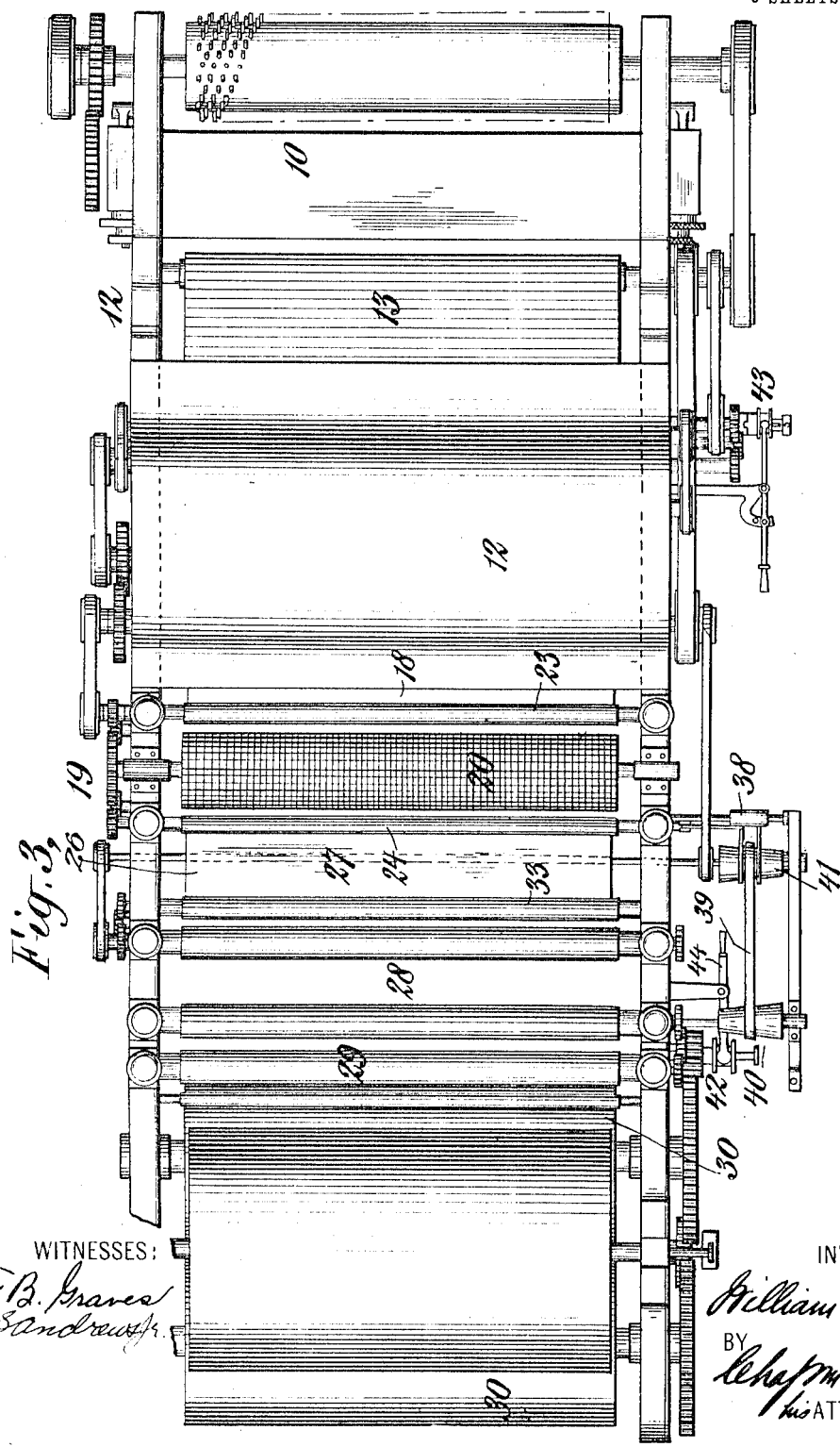
WITNESSES:
F. B. Graves
J. S. Andrews Jr.
INVENTOR
William H. Harriss
BY
Chapin Wayland
his ATTORNEYS W. H. HARRISS.
APPARATUS FOR PREPARING COTTON FIBERS.
APPLICATION FILED JULY 20, 1909.
1,117,567.
Patented Nov. 17, 1914.
5 SHEETS—SHEET 4.
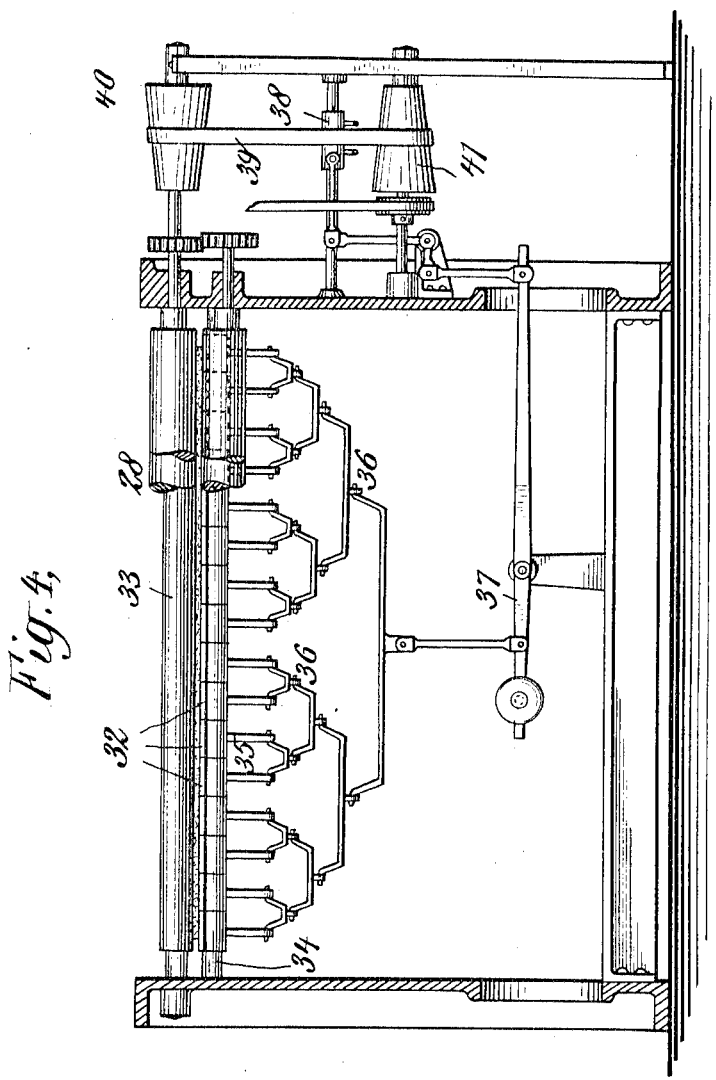
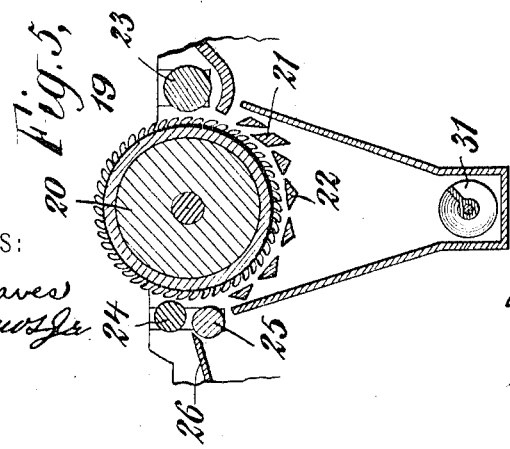

W. H. HARRISS.
APPARATUS FOR PREPARING COTTON FIBERS.
APPLICATION FILED JULY 20, 1909.
1,117,567.
Patented Nov. 17, 1914.
5 SHEETS—SHEET 5.
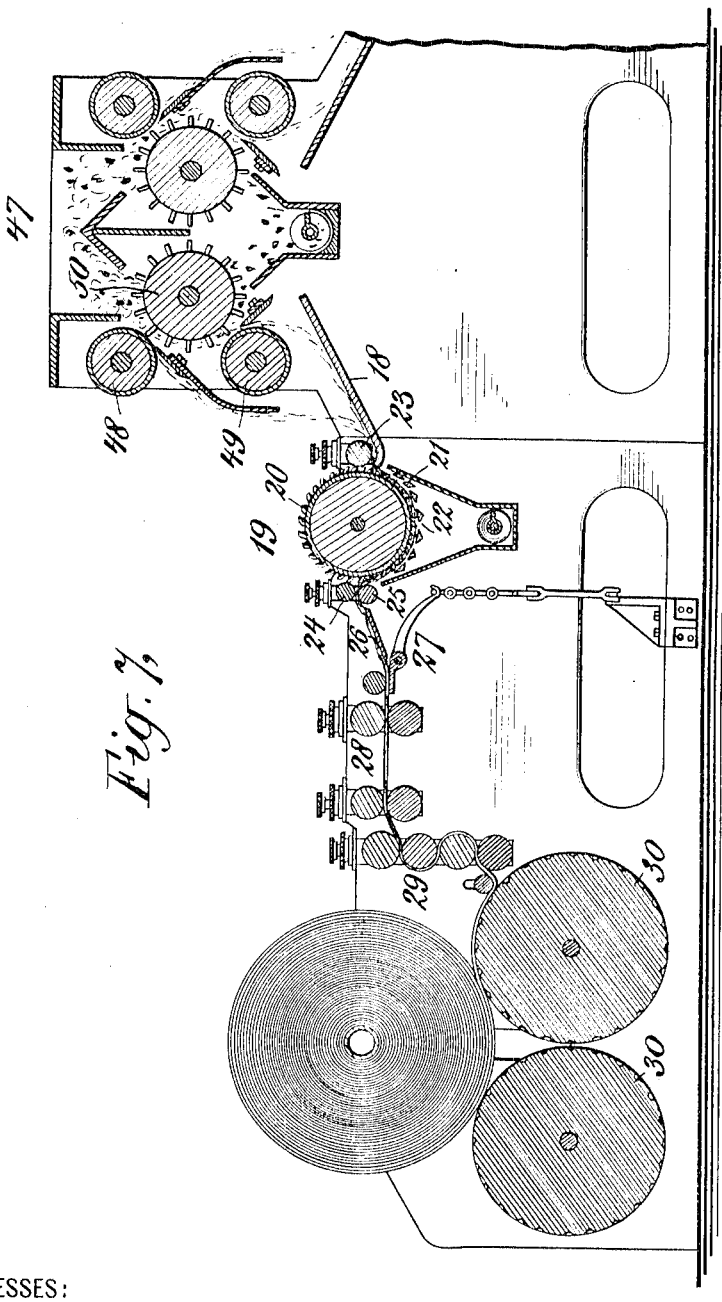
WITNESSES:
F. B. Graves
L. S. Andrews Jr.
INVENTOR
William H. Harriss
BY
Chapin & Hayward
his ATTORNEYS

UNITED STATES PATENT OFFICE.

WILLIAM H. HARRISS, OF PAWTUCKET, RHODE ISLAND, ASSIGNOR TO EMPIRE DUPLEX GIN COMPANY, OF NEW YORK, N. Y., A CORPORATION OF ARIZONA.

APPARATUS FOR PREPARING COTTON FIBERS.

1,117,567. Specification of Letters Patent. Patented Nov. 17, 1914.

Application filed July 20, 1909. Serial No. 508,601.

*To all whom it may concern:*

Be it known that I, WILLIAM H. HARRISS, a citizen of the United States of America, and a resident of Pawtucket, county of Providence, and State of Rhode Island, have invented certain new and useful Improvements in Apparatus for Preparing Cotton Fibers, of which the following is a specification, reference being had to the accompanying drawings, forming a part thereof.

My invention relates to improvements in apparatus for preparing cotton fibers, and particularly to that class of cotton treating machinery included generally in the term "preparatory machinery" in which cotton fibers received from the gin after a ginning operation are prepared prior to their being twisted and drawn into threads.

In my present apparatus I take cotton fibers directly from the gin in which the raw cotton has been operated upon to remove the seeds, and thereupon immediately act upon the fibers to straighten them out and parallelize them. I then form them into a lap while in this condition, and finally roll them up into the form of a lap roll or bale. I preferably straighten and parallelize the fibers by some form of apparatus, such for instance, as a "licker-in", by which they are also cleaned, that is to say,—broken pieces of seed, leafy trash, and the like, are removed therefrom, and I also preferably pass the fibers through drawing rolls which tend further to straighten and parallelize them and to stretch them prior to the final rolling up of the lap. The bale or lap roll thus formed is ready to be placed directly in a carding or combing machine.

It has been common in the past to gin the cotton at or near the place where the cotton is grown, the product from the gin being formed into a bale in which form it is shipped to a cotton mill to be later treated. The fibers as they are received from the gin usually pass to a gin condenser in which they are collected together in close relation and are then usually pressed together in a hydraulic press so as to reduce the size of the bale in proportion to its weight, the fibers being covered with a bagging and then held in their compressed condition by metallic ties or straps. When received at the mill the first step is disbaling, that is, the ties and bags are removed; next the bale is broken up,—usually by hand; next it is conveyed, usually by suction and air pressure, to storage bins where it is stored for the purpose of "aging" it. The pressure to which the fibers are subjected in the bale press has the effect of bending and distorting the fibers, and owing to the length of time during which the fibers usually remain in the bale the fibers are apt to become set in their bent condition,—that is to say, they do not readily straighten out after disbaling. This necessitates their being stored for a long time in a loose condition in the bins whereby the fibers can gradually straighten out. After the fibers have been aged they are now presented to machines known as "self feeders" and "openers." These machines tend to open out the fibers and to feed a predetermined regular quantity forward for the next step. From the self feeders and openers the fibers go to a breaker lapper in which machine the cotton is acted upon by rapidly revolving beater arms to further separate the fibers and clean them, and in this machine they are then rolled and pressed into the form of a lap and finally rolled up into a rolled lap form. A plurality of these laps (four more or less) are then presented in a machine known as an intermediate lapper in which the several laps are acted upon by similar beater arms so as to further clean them, the fibers then being formed again into a single lap. Thence the laps are treated in a finisher lapper, the product therefrom being a rolled up lap which is now ready for the carding machine. The lap resulting from the foregoing operations is, however, a sheet of matted fibers which cross and re-cross each other and the straightening or parallelizing of the fibers which is absolutely necessary to the final product, takes place in the carding or combing machine. It is, moreover, a fact that many of the foregoing operations are exceedingly injurious to the fibers, the beater arms in the breaker lapper, the intermediate lapper, and the finishing lapper having the effect of breaking, rupturing, and bending the fibers so that it is necessary in producing a high grade material to reject a large proportion of the fibers in the carding machine, and it is common to reject as high as fifty per cent. of the product of the carding machine, such rejected portion being absolute waste so far as the manufacture of high grade goods is concerned. Again, the bending of the fibers in the cotton press (in view of the considerable length of time in which the fibers are maintained in this position in the bale) produces a permanent distortion of a considerable portion of the fibers such as is not cured by the aging, and the result of this is a further loss due to fibers which are never straightened out, or which, in the attempt to straighten them out, are broken.

It is the object of my present invention to avoid the injury to the fibers which results from the foregoing method of operation, and also to reduce very largely the cost of handling the fibers by eliminating a large number of the steps which have hitherto been employed in accordance with the foregoing, and I attain this object by straightening, cleaning and parallelizing the fibers as they come from the gin and forming them directly into a rolled lap in which condition I cover them with a suitable bale cover and then ship them directly to the mill where they are ready to be received by the carding or combing machine.

A further object of my invention is to reduce the danger from fire. The exposure of a large quantity of the fibers in a loose condition in the aging bins has been productive in the past of a great many fires, cotton in this condition being extremely inflammable,—so much so that the cotton mills have been compelled to figure on an annual loss, by fire, or the payment of a very heavy fire insurance premium,—and as by my present method of handling the fibers this aging step becomes unnecessary, this particular danger is eliminated.

In order that my invention may be fully understood, I will now proceed to describe an apparatus constituting an embodiment thereof, and will then point out the novel features in claims.

Figure 2:
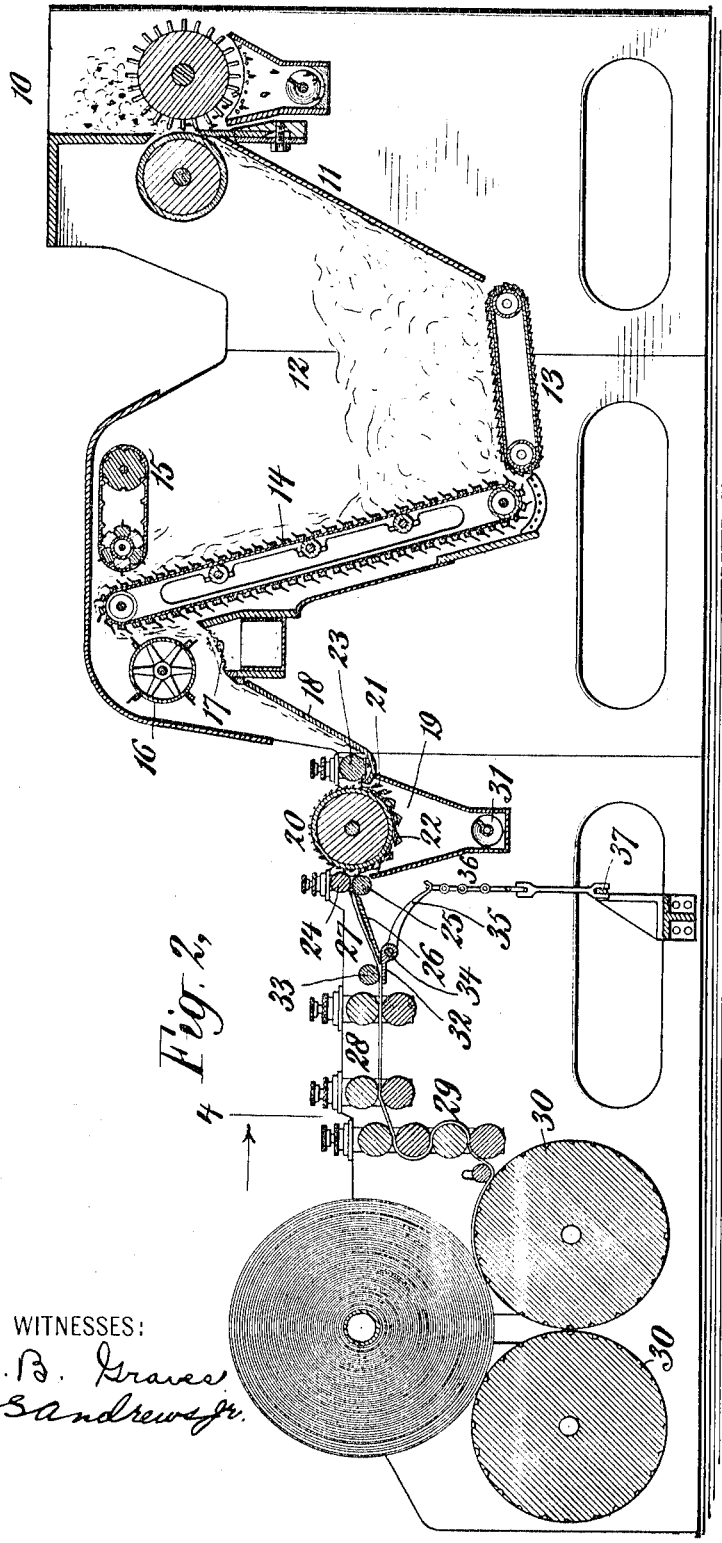
Figure 6:
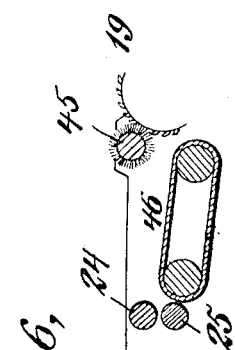

In the drawings: Figure 1 is a view in side elevation of such an apparatus. Fig. 2 is a view in central vertical longitudinal section therethrough. Fig. 3 is a top view of the same. Fig. 4 is a view in transverse section therethrough, the plane of section being taken substantially upon the line 4—4 of Fig. 2. Fig. 5 is a transverse sectional view upon an enlarged scale of the licker-in. Fig. 6 is a detail view in transverse section of a modified form of doffing device for the licker-in. Fig. 7 is a view in central longitudinal section of a modified form of the apparatus.

In the apparatus illustrated in the first five figures the cotton is received in a gin 10 by which the seeds are removed and the lint or cotton fibers delivered upon a board 11. The board 11 forms one wall of the feed box 12 of a self-feeder. This self-feeder may comprise the usual lattice conveyer 13 for feeding the cotton forward, the spiked lattice elevator 14 for carrying the fibers upward, the lattice evener 15 for scraping off surplus fibers, a clearer 16 for removing the fibers from the elevator 14, and a sieve 17 for cleaning the fibers. An even sheet of the fibers is delivered by this self-feeder, in a manner well known, down a feed board 18, to a combing means 19 of desired form. This combing device may conveniently be a licker-in of the well known form such as is commonly employed in a carding machine, comprising a roller having a plurality of parallel rows of flat-sided sharp-pointed teeth 20 in staggered relation to one another, with their sides at right angles to the axis of the roller 20, mote knives 21, and grids 22. A fluted feed roll 23 may be conveniently employed to feed the material to the licker-in, and a doffer 24 of any convenient form may also be employed for insuring the removal of the fibers from the teeth of the licker-in. The product is then fed with its fibers in their straightened parallel condition, directly into a lap forming device which comprises the doffer roll 24 and a feed roll 25, thence along a feed board 26 to the fingers of an automatic evener 27, and thence preferably to one or more sets of drawing rolls 28; thence the product passes through condenser rolls 29 to rolls 30 upon which the lap is supported and by which it is rolled up. The self-feeder is designed to feed an even quantity of the fibers in loose sheet form, just as they are received from the gin, to the licker-in, a certain amount of cleaning taking place during the operation in a manner well known. The licker-in operates to comb, straighten, and arrange the fibers in parallelism, delivering the fibers in sheet form upon the feed board 26 in straightened and parallel condition. The licker-in also serves to clean the fibers, the motes and larger portions of refuse being removed by the mote knives, and the dust, etc., being filtered through the grids to be finally carried away by a conveyer 31. The drawing rolls 28 act to further straighten and parallelize the fibers, the relative speed of the rollers being controlled by the evener 27. The evener comprises a plurality of fingers 32 which press the sheet of fibers against a roller 33. These fingers 32 are pivoted at 34 and are provided with arms 35 which are connected through a series of yokes 36 (see Fig. 4) with a weighted lever 37, the latter being connected by suitable links and levers with a speed changing device comprising a belt shipper 38, a belt 39, and cone pulleys 40—41. The cone pulley 41 is driven by suitable belt connections from the main driving shaft of the apparatus while the pulley 40 is mounted upon the shaft of the forward set of drawing rollers 28. When the thickness of the sheet of fibers which passes between the fingers 32 and the roller 33 increases, the fingers 32 are depressed, the yokes 36 are lifted, and the lever 37 is operated to move the belt shipping device to the left as shown in Fig. 4, whereby to carry the belt over to the larger portion of the pulley 41 and over the smaller portion of the pulley 40. This will increase the speed of drive of the forward set of drawing rolls with relation to the speed of drive of the rearward set, so as to place a greater draft upon the sheet and thereby to stretch the sheet and reduce the thickness thereof. The compression rolls 29 and the rolling up rolls 30 are connected with the forward set of drawing rolls by means of a train of gearing 42, whereby the lap is taken up and is rolled up in the roll form at the proper rate of speed regulated in accordance with the speed at which the last set of drawing rolls delivers it.

The first set of drawing rolls, the licker-in, the gin, and the self-feeder are all driven from a suitable source at the proper relative speeds, the shafts of the various apparatus being preferably connected by belts and gearing for the purpose of maintaining such relation. The self-feeder is, however, preferably provided with a clutch 43 by means of which it may be disconnected from driving relation with the other parts, at will. This is for the reason that while it is advantageous to continue the running of the gin so as to get the utmost capacity therefrom it is necessary to occasionally stop the delivery of fibers when a complete lap roll has been formed so that such lap roll may be removed and a rod, bar, or core inserted for the starting up of a fresh lap roll. As it is entirely immaterial whether or not the licker-in, drawing rolls, and compression rolls operate during the time the self-feeder is stationary because of the reason that no material will be fed thereto at such times, I have shown no means for disconnecting the same when the self-feeder is stopped, but it is, of course, obvious that clutches for connecting and disconnecting the various parts may be employed wherever they are thought to be necessary or desirable. I have however shown such a clutch at 44 for throwing the rolls 30 out of driving relation so that they may be stopped at will without stopping the rest of the mechanism. When the self-feeder is stopped the product from the gin will, of course, pile up in the feed box thereof, but the feed box is intended to have such a capacity as to take care of all the product of the gin, the feeding mechanism being arranged so as to feed fibers out slightly faster than they are received therein from the gin so as to compensate for the extra material fed thereto while the gin is working and the feeding mechanism is idle.

To insure the doffing of the material from the licker-in so that the same will be properly delivered upon the feed board 26 in the form of a lap, the doffer 24 may be run at a slightly greater surface speed than that of the licker-in.

In Fig. 6 I have shown a slightly modified form of the doffing means in which the member corresponding to the doffer roll 24 of Fig. 2 is shown as a brush 45 and the material is deposited from the licker-in teeth upon a traveling lattice 46 to pass thence between the feed rolls 24 and 25. It is, of course, obvious that any suitable form of doffing mechanism may be employed.

In Fig. 7 I have shown a modified structure of the entire apparatus in which the self-feeder is omitted. In certain forms of cotton gin, such, for instance, as in the gin known on the market to-day as the "Empire duplex gin," the fibers are not only delivered quite uniformly but in an unusually clean condition,—this being especially true where the raw cotton is well cleaned before it is presented to the gin. Where the product is substantially uniform it may be delivered directly to the licker-in or other combing device though, of course, in such case it will be necessary to stop the gin at the time of completion of one lap roll and the commencement of a new one. In Fig. 7, 47 designates a duplex gin in which the delivery to the licker-in is made from two ginning rollers 48 and 49, the said ginning rollers being both arranged for co-action with a single stripping member 50. The gin 47 is shown as provided with two sets of such ginning rollers and stripping member,—one upon either side of a central line therethrough. One set, however, only are intended to be employed with the apparatus shown in Fig. 7, the other set being designed for employment with a duplicate apparatus which may be disposed to the right of the mechanism shown in Fig. 7, such an arrangement being economical of floor space, power, and attendance.

The lap roll after having been removed from this apparatus is ready to be inserted directly in a carding or combing machine, and it will be readily understood that because of the fact that the fibers have already been straightened and parallelized, very much less work is imposed upon the carding machine than is at present the case where the lap roll consists of a mass of crossed and unstraightened fibers. I make no claim, however, in the present application to the particular form of lap which is produced nor to the method or process of producing it, the same forming the subject matter of a separate application co-pending herewith.

What I claim is:

1. In apparatus for preparing cotton fibers, the combination with means for feeding cotton fibers in a conglomerate condition to a rotary member, having means thereon for combing, straightening, and arranging the fibers in parallelism, of a lap forming means comprising a pair of rolls, a draft roll for operating upon the product delivered from the lap forming rolls, and an automatic evener governed by the thickness of the lap of fibers for regulating the relative rate of rotation of the lap forming rolls and of the draft rolls.

2. In an apparatus for preparing cotton fibers, the combination with means for feeding cotton fibers in a conglomerate condition to a rotary member having a plurality of parallel rows of pointed teeth thereon in staggered relation to one another for combing, straightening and arranging the fibers in parallelism, of a lap forming means comprising the doffer roll operating at surface speed which differs from that of the rotary member and a feeder roll associated therewith, a plurality of pairs of draft rolls for operating upon the product delivered from the lap forming rolls, and an automatic evener governed by the thickness of the lap for regulating the differential speed of rotation of the lap forming rolls and also the speed of rotation of the draft rolls.

3. In apparatus for preparing cotton fibers, the combination with a rotary member provided with means for combing, straightening and parallelizing the fibers and feeding them forward, of a lap forming means adapted to receive the fibers from the rotary member comprising a doffer roll arranged to operate at a surface speed which is slightly higher than that of the rotary member and a feed roll associated therewith.

4. In apparatus for preparing cotton fibers, the combination with a rotary member provided with means for combing, straightening and parallelizing the fibers and feeding them forward, of a lap forming means adapted to receive the fibers from the rotary member comprising a doffer roll arranged to operate at a surface speed which is slightly higher than that of the rotary member and a feed roll associated therewith, draft rolls and an automatic evener for regulating relative speed of rotation of the lap forming rolls and the draft rolls.

5. In apparatus for preparing cotton fibers the combination with a rotary member provided with means for combing, straightening and parallelizing the fibers and feeding them forward, of a lap forming means adapted to receive the fibers from the rotary member comprising a doffer roll arranged to operate at a surface speed which is slightly higher than that of the rotary member and a feed roll associated therewith, a plurality of pairs of draft rolls located beyond the lap forming means and an automatic evener for regulating the speed of one pair of draft rolls.

WILLIAM H. HARRISS.

Witnesses:
E. V. SUTTON,
CLARA E. NERR.